(12) United States Patent
Dimarco

(10) Patent No.: US 7,121,072 B1
(45) Date of Patent: Oct. 17, 2006

(54) RIDER MOWER GRASS CATCHER

(76) Inventor: Ralph Dimarco, 206 Bedford St., Middleboro, MA (US) 02346

( * ) Notice: Subject to any disclaimer, the term of this patent is extended or adjusted under 35 U.S.C. 154(b) by 0 days.

(21) Appl. No.: 11/182,413

(22) Filed: Jul. 18, 2005

(51) Int. Cl.
*A01D 43/00* (2006.01)
*A01D 43/06* (2006.01)

(52) U.S. Cl. .................................................. 56/202

(58) Field of Classification Search ............. 56/202, 56/205, 203, 206, 16.6; 414/519
See application file for complete search history.

(56) References Cited

U.S. PATENT DOCUMENTS

| | | | |
|---|---|---|---|
| 1,382,523 A * | 6/1921 | McMillan ................ 402/70 |
| 2,747,356 A | 5/1956 | Peterson |
| 2,783,604 A | 3/1957 | Cahill, Jr. |
| 2,851,844 A | 9/1958 | Bailey |
| 2,903,837 A | 9/1959 | Titzer |
| 3,014,330 A | 12/1961 | Oberdick |
| 3,143,842 A | 8/1964 | Mattson et al. |
| 3,492,800 A | 2/1970 | Peterson et al. |
| 3,494,116 A | 2/1970 | Lempke |
| 3,541,770 A | 11/1970 | Dufour |
| 3,553,947 A | 1/1971 | Root |
| 3,797,578 A | 3/1974 | Velasquez |
| 3,805,500 A | 4/1974 | Sweet |
| 3,881,304 A | 5/1975 | Lempke |
| 3,925,968 A | 12/1975 | Wagenhals |
| 4,069,649 A | 1/1978 | Mullet et al. |
| 4,251,982 A | 2/1981 | Skaja et al. |
| 4,265,079 A | 5/1981 | Hoffmann |
| 4,648,238 A | 3/1987 | Greider et al. |
| 4,665,684 A | 5/1987 | DiPaolo |
| 4,709,541 A | 12/1987 | Broman et al. |
| 5,036,650 A | 8/1991 | Tesch et al. |
| 5,074,106 A | 12/1991 | DiPaolo |
| 5,076,045 A | 12/1991 | McClung, IV |
| 5,249,842 A | 10/1993 | Doering et al. |
| 5,542,242 A | 8/1996 | Poulos |
| 6,155,035 A | 12/2000 | Merritt, III |
| 6,226,970 B1 | 5/2001 | Busboom et al. |
| 6,546,710 B1 | 4/2003 | DeHart |
| 6,595,737 B1 | 7/2003 | Parish |
| 2003/0019201 A1 | 1/2003 | Eavenson, Sr. |

* cited by examiner

*Primary Examiner*—Árpád Fábián Kovács
(74) *Attorney, Agent, or Firm*—John P. McGonagle

(57) ABSTRACT

A side cart mounted directly to one side of a tractor or rider lawn mowing blade housing deck. The side cart has an opening adjacent to the grass cutting discharge chute. Fastened to the bottom of the side cart is a steel sheet which is bent upwards at the front and rear. In one embodiment of the invention a hard plastic liner is pivotally installed in the side cart. The liner has a long handle attached thereto which permits the user to empty the side cart to the rear of the side cart without using a snow shovel.

13 Claims, 8 Drawing Sheets

RIDER MOWER GRASS CATCHER

BACKGROUND OF THE INVENTION

This invention relates to grass catchers, and in particular, to grass catcher for a rider lawn motor having a side grass discharge port in the blade housing.

Riding lawn mowers are widely used. These mowers are generally used for cutting grass on large lawns, and further for clipping and mulching leaves and other organic material on such lawns. It is desirable to have all of the debris thrown from the outlet of the mowing blade housing such as grass clippings, thatch, and leaves, collected so that they do not fall on the cut lawn. It is, therefore, necessary to provide means to contain the clippings on the mower and easily dispose of the container contents.

Various types of containers for collecting debris produced from a riding lawn mower have previously been suggested. Periodically, as the container is filled to capacity, the container must be emptied before equipment operation can continue. In the absence of automatically powered emptying means (which are very expensive and complicated), a user must stop the rider mower, dismount, and manually empty the container, either by physically removing and upending it, or by directly removing the collected load of debris itself. Proper safety precautions demand that the user completely halt operation of the rider mowing equipment and fully deboard prior to carrying out such emptying procedure.

The disruptive effect this causes to the user's efforts to complete the required work and the added physical exertion it requires of him or her are significant. This is especially so given that, where a receptacle container is reduced in size to lessen the weight and volume of its load capacity (so as to minimize the physical exertion required to empty it), the frequency with which the container must be emptied is necessarily increased. Conversely, where the receptacle assembly's container is increased in capacity to reduce the frequency with which it must be emptied, the container quickly becomes much more cumbersome and difficult to empty. Yet, prompt and regular emptying of the receptacle assembly's container remains a necessity, lest a clog form in the chuted path through which solid debris is expelled and directed from the vehicular equipment's working mower deck to the receptacle assembly not only interrupting further equipment operation, but requiring the user to take the necessarily time consuming and inconvenient remedial measures.

SUMMARY OF THE INVENTION

The rider mower grass catcher of the present invention provides a simple, effective and efficient method of cutting and collecting grass, leaves and other debris in one operation. The present invention provides a side cart mounted directly to one side of a tractor or rider lawn mowing blade housing deck. As grass is cut and expelled out the side of the mower deck, it enters directly into an opening in the side cart. The side cart has a lid which may be opened by the user riding the mower without dismounting. Any side cart entrance pile ups may be easily moved to the side cart rear with a modified straw broom. When the side cart is full, the grass is taken to a central disposable location where it is easily emptied with a snow shovel. In one embodiment of the invention a hard plastic liner is pivotally installed in the side cart. The liner has a long handle attached thereto which permits the user to empty the side cart to the rear of the side cart without using the snow shovel. Fastened to the bottom of the side cart is a galvanized steel sheet which is bent upwards at the front and rear. This allows the side cart to glide over the lawn. Since prior art suction tubes are eliminated, grass can be cut when it is wet and when it is as high as three feet or more. The invention is especially useful on lawns of one half acre and larger.

These together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

DETAILED DESCRIPTION OF INVENTION

Figure 1:
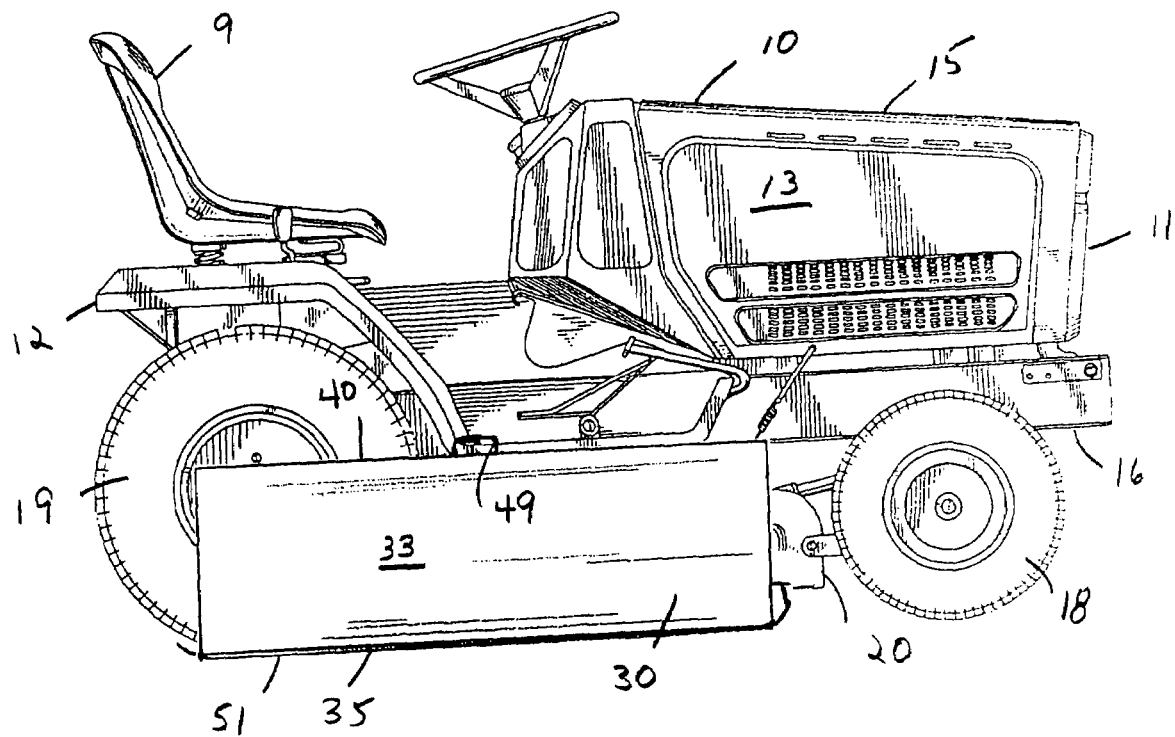
FIG. 1 is a right side view of a rider mower with side cart attached.
Figure 2:
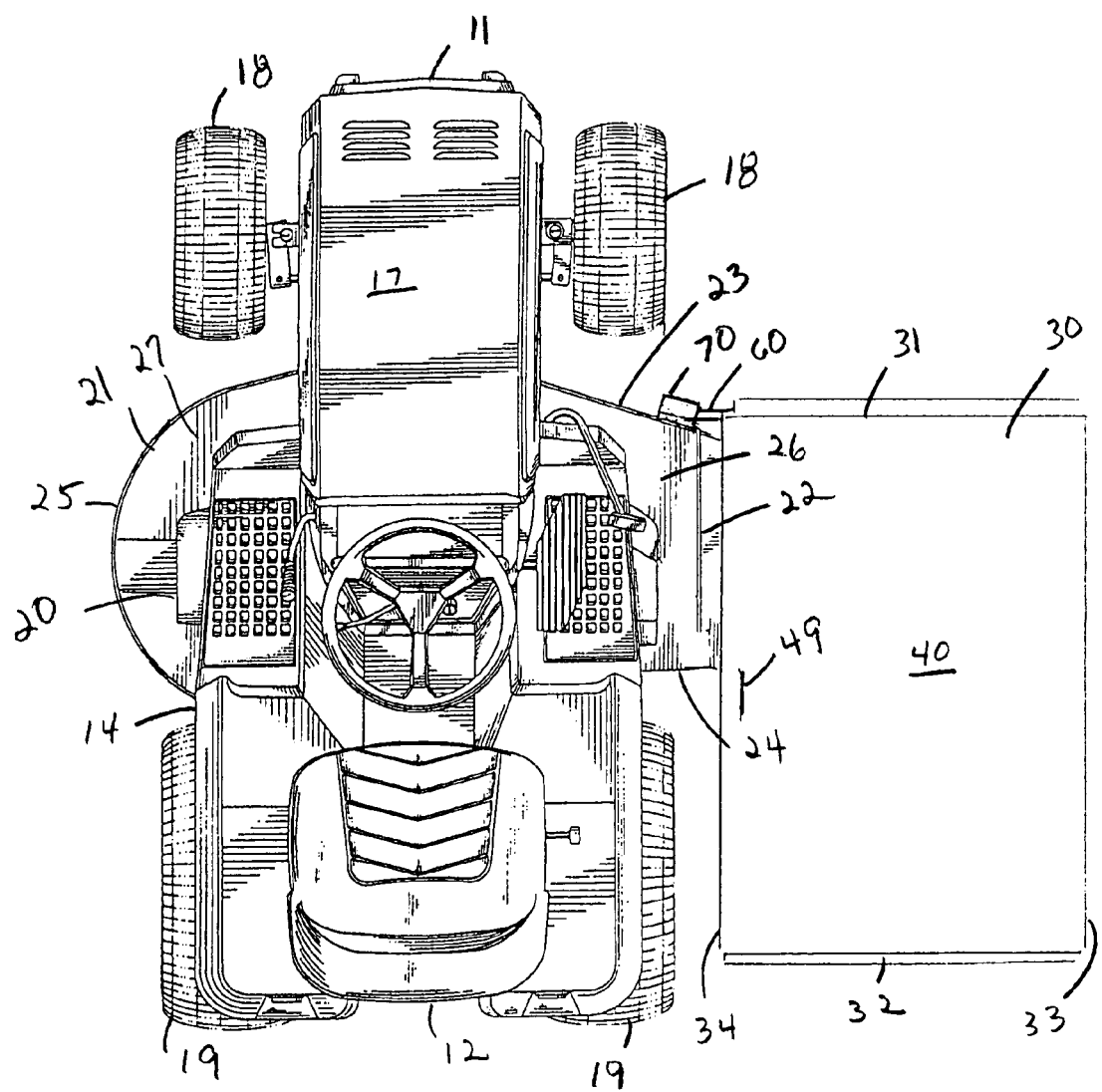
FIG. 2 is a top view of the rider mower and side cart of FIG. 1.
Figure 3:
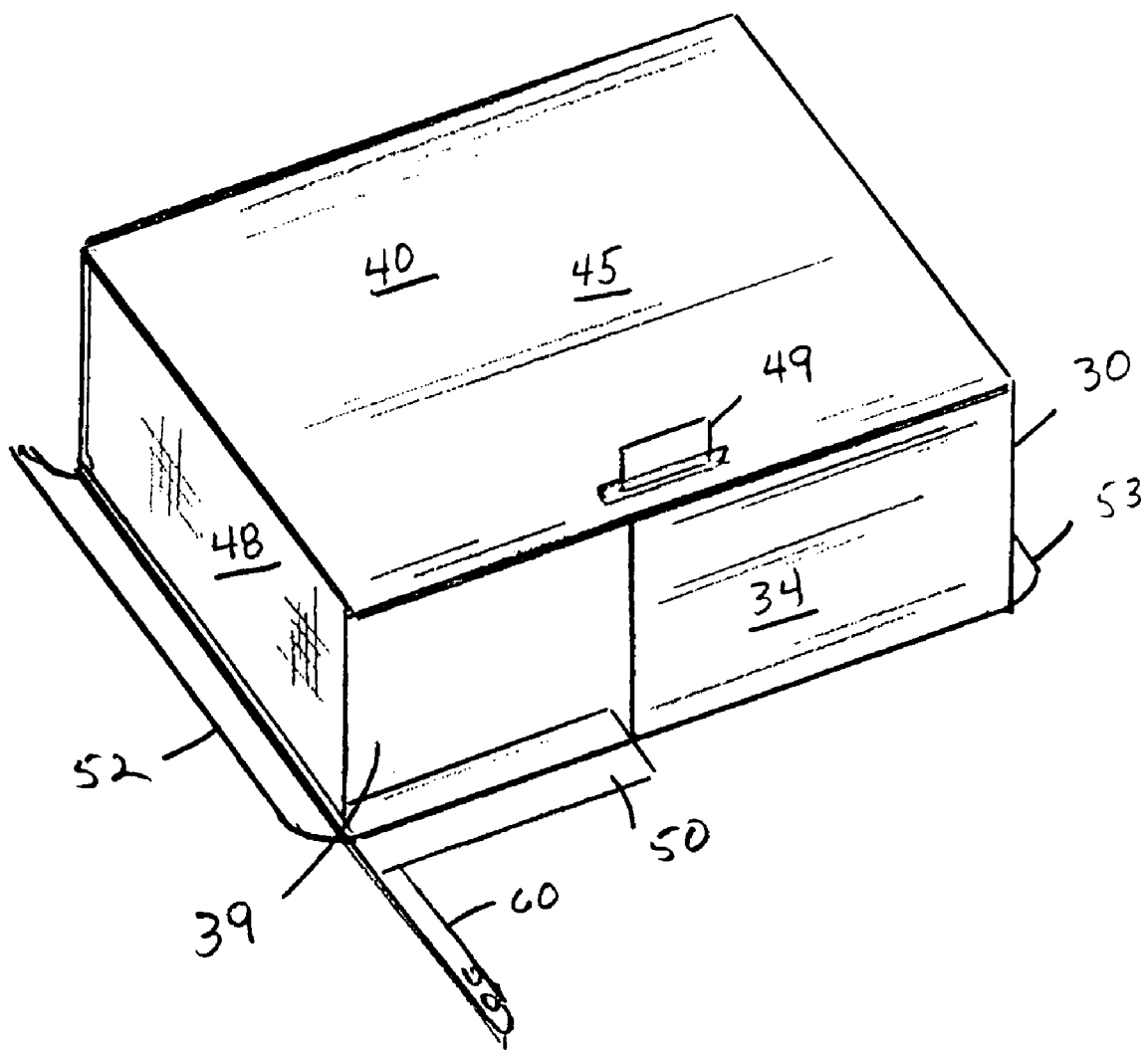
FIG. 3 is a front perspective view of the side cart.
Figure 4:
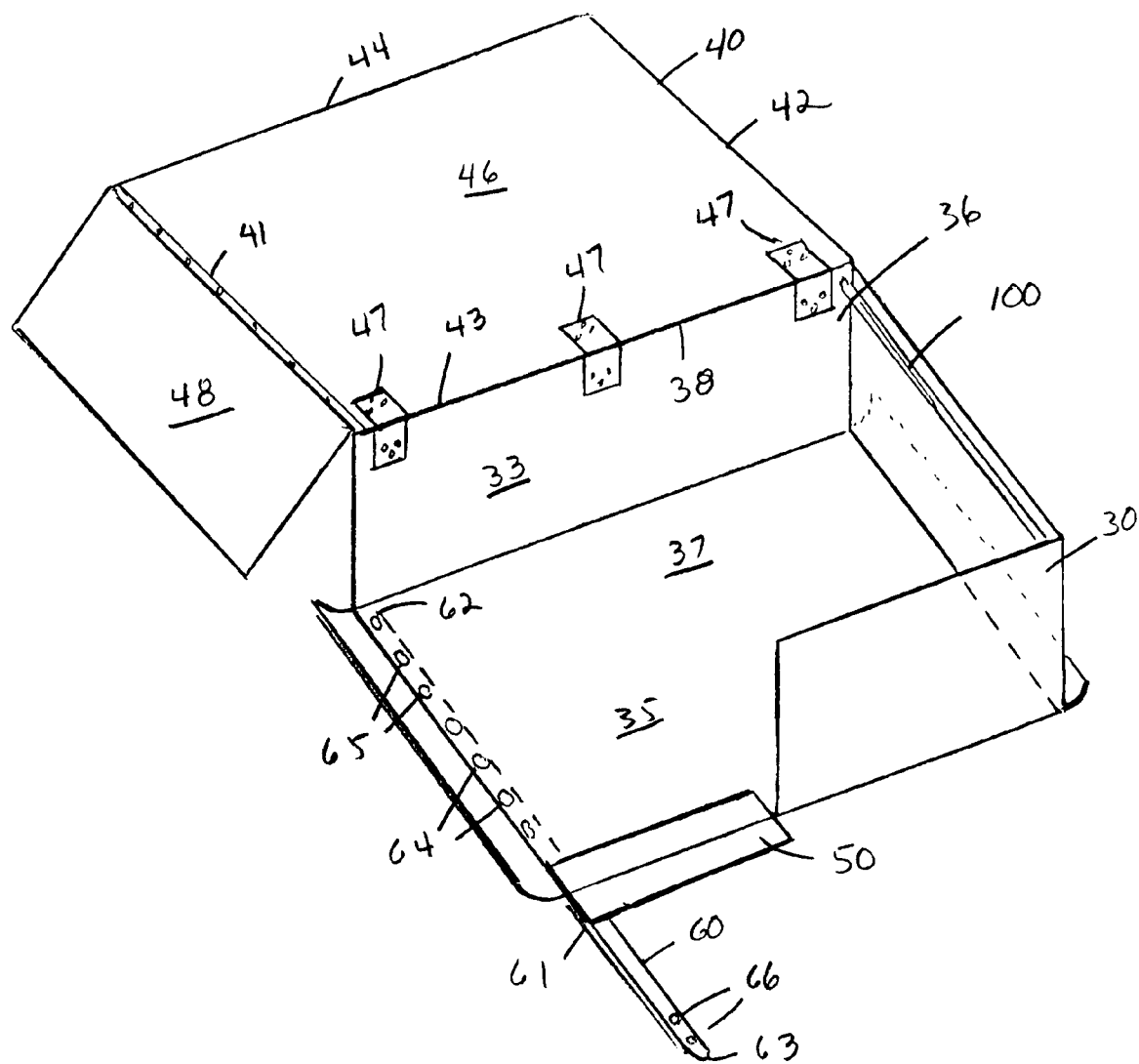
FIG. 4 is a view of the side cart of FIG. 3 with lid open.
Figure 5:
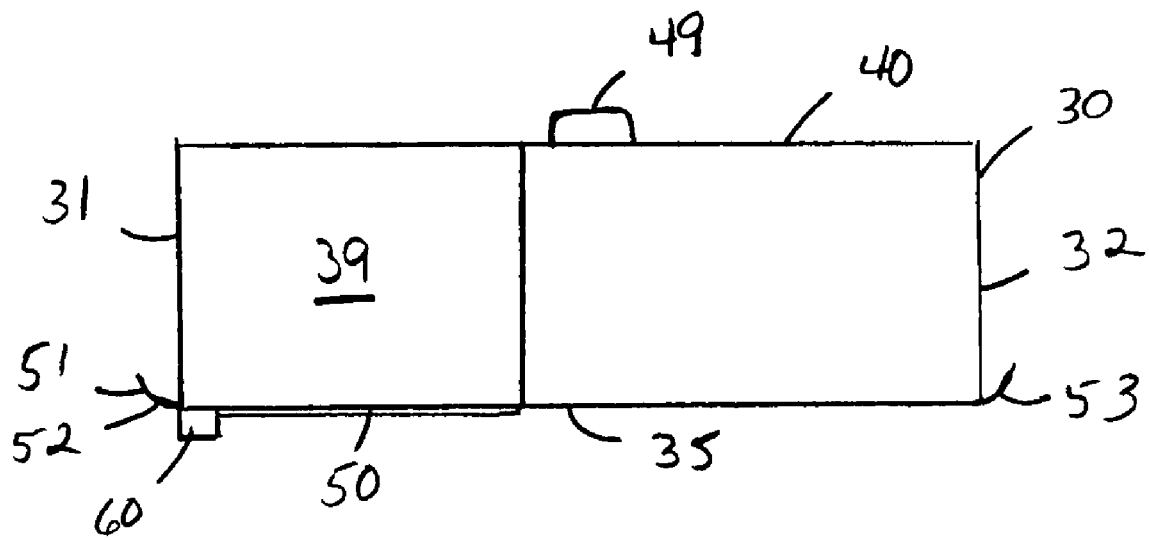
FIG. 5 is a left side view of the side cart of FIG. 3.
Figure 6:
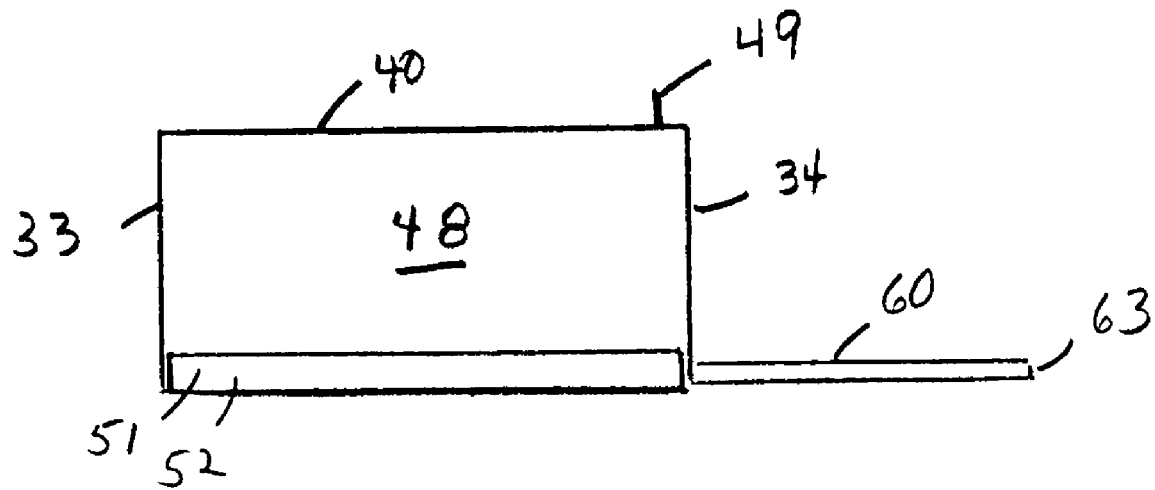
FIG. 6 is a front view of the side cart of FIG. 3.
Figure 7:
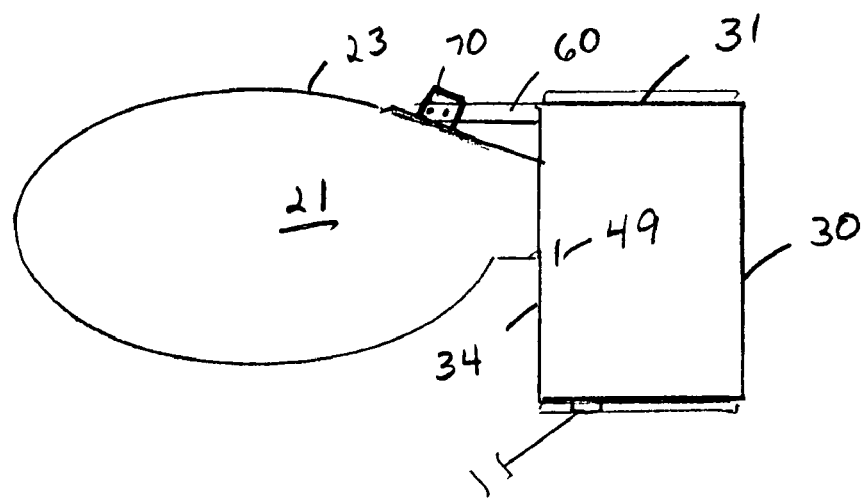
FIG. 7 is a top view of the side cart attached to a mower assembly housing deck.
Figures 8, 9, 10:
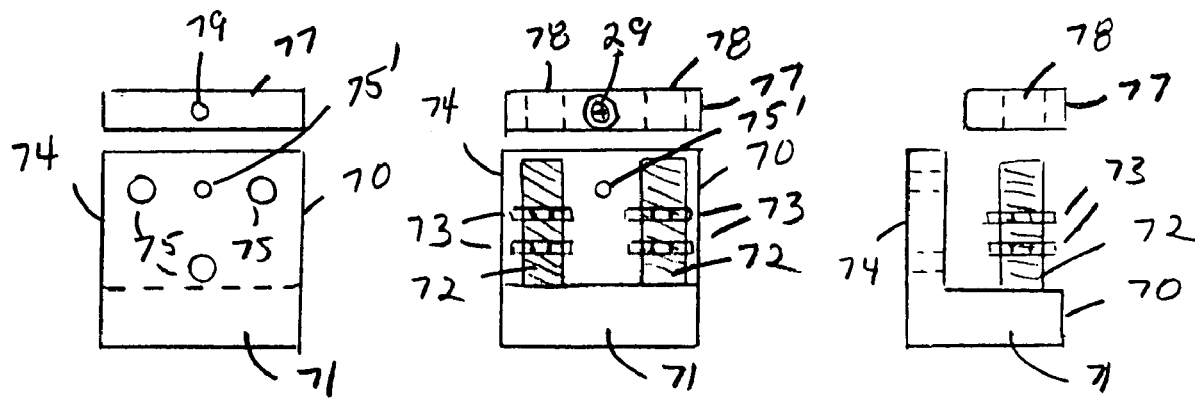
FIG. 8 is a rear view of a mounting block.
FIG. 9 is a front view of a mounting block.
FIG. 10 is a side view of a mounting block.
Figure 11:
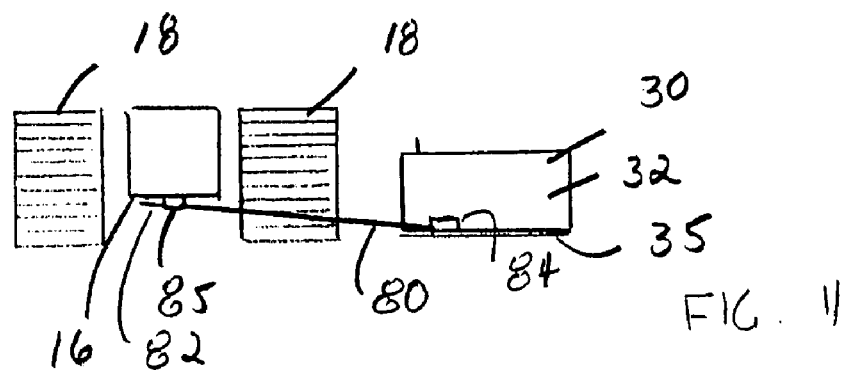
FIG. 11 is a rear diagrammic view of a side cart stabilizer bar attached to the bottom of a rider lawn mower.
Figure 12:
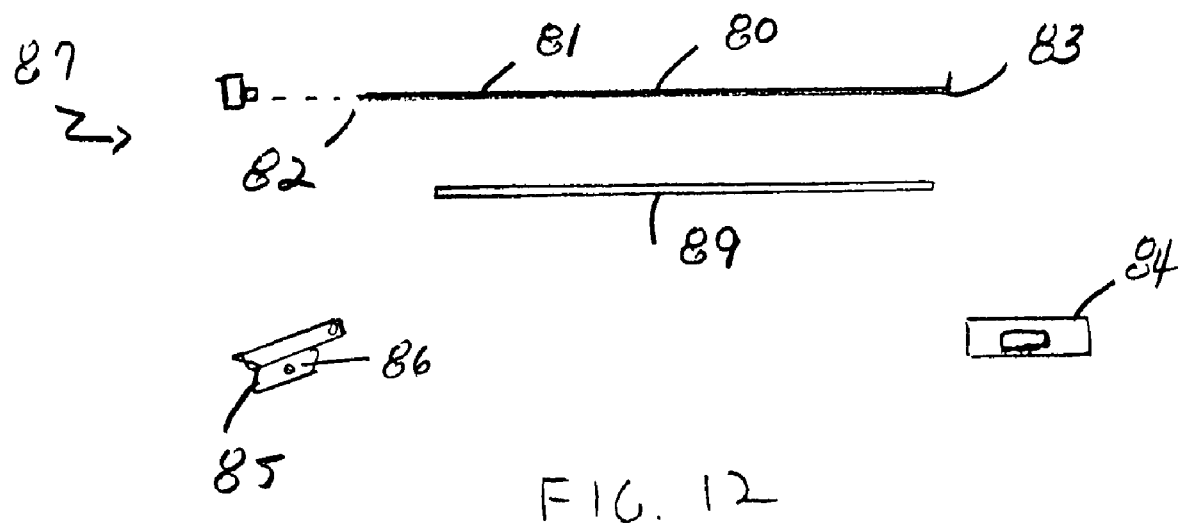
FIG. 12 is a view of a stabilizer bar assembly.
Figure 13:
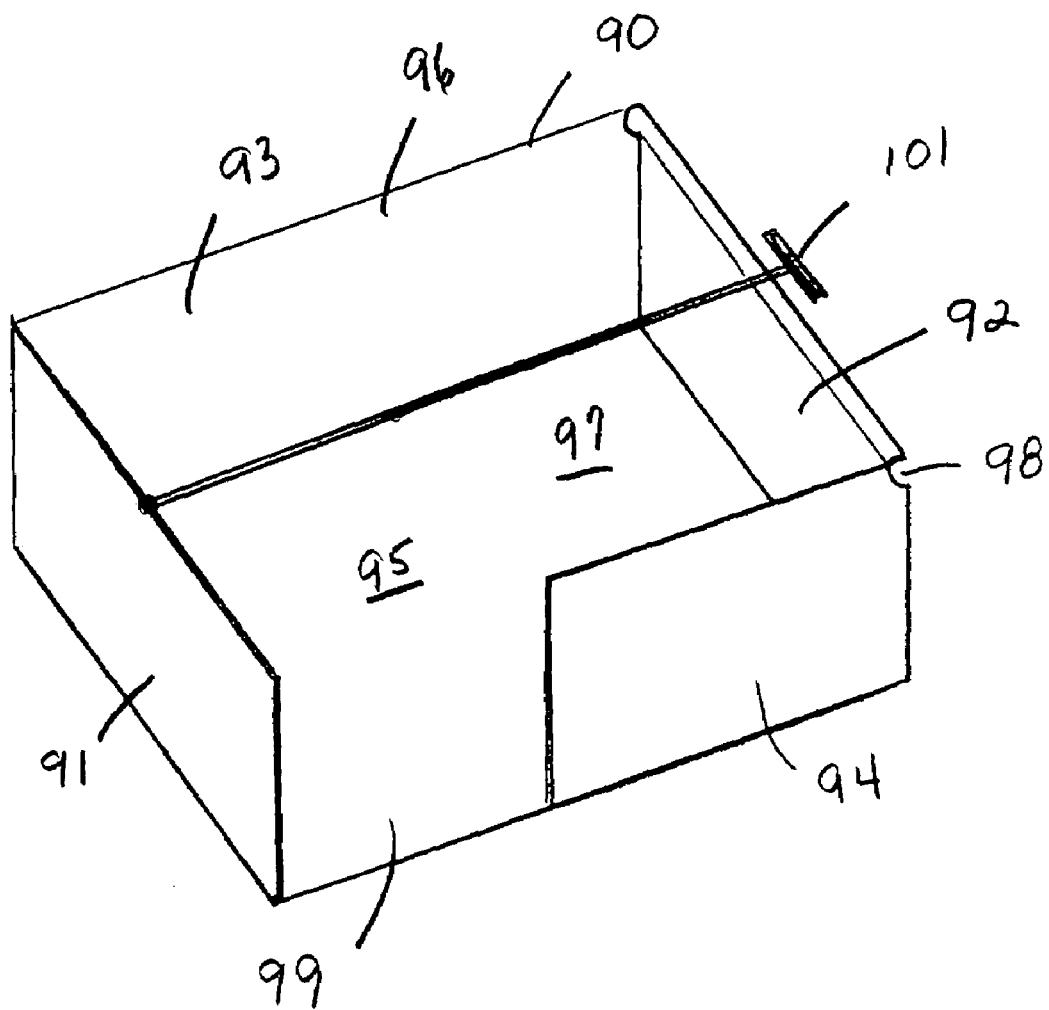
FIG. 13 is a front perspective view of a side cart liner.

Referring to the drawings in detail wherein like elements are indicated by like numerals, there is shown a rider lawn mower 10 having a front 11, rear 12, right side 13, left side 14, a top 15, and a bottom 16, said front 11 and rear 12 defining a rider lawn mower longitudinal axis. In this embodiment of the invention the rider lawn mower 10 has an engine 17 toward the front 11 above two forward wheels 18. The top 15 has a seat 9 above two rearward wheels 19. The rider lawn mower 10 has a mower assembly 20 attached to the rider lawn mower bottom 16 longitudinally positioned between the forward wheels 18 and the rearward wheels 19. The mower assembly 20 has a housing deck 21 covering a mower blade assembly (not shown), said housing deck 21 having a discharge port 22 extending past the rider lawn mower right side 13. The mower assembly housing deck 21 has a front 23, rear 24, left side 25, right side 26 and a top 27.

The present invention is comprised of a side cart 30 adapted to be positioned to the rider lawn mower right side 13 and attached to the mower assembly housing deck front 23. The side cart 30 has an open front 31, rear panel 32, right side panel 33, left side panel 34, bottom 35, and open top 36, said side cart front 31 and rear 32 defining a side cart longitudinal axis. The side cart front 31, rear panel 32, right side panel 33, left side panel 34, bottom 35, and open top 36 define a side cart interior 37. The side cart right side panel 33 has a top edge 38. The side cart left side panel 34 has an opening 39 extending from the side cart front 31 a predetermined distance toward the side cart rear 32, and extending from side cart bottom 35 to top 36.

A lid 40 is pivotally attached to the side cart right side top edge 38. The lid 40 has a generally rectangular shape with a front edge 41, rear edge 42, hinged right edge 43, left edge 44, exterior surface 45 and interior surface 46, said front edge 41 and rear edge 42 defining a lid longitudinal axis. The lid 40 has dimensions approximately equal to the dimensions of the side cart bottom 35. The hinged right edge 43 is joined to the side cart right side top edge by means of a hinging means 47. The lid front edge 41 has a canvas flap 48 attached thereto. A handle 49 is centrally attached to the lid exterior surface 45 near to the lid left edge 44.

The side cart bottom 35 along the left side opening 39 has a protective tin flap 50 attached thereto. A 20 AWG galvanized steel sheet 51 is attached externally to the side cart bottom 35. The steel sheet 51 has a forward portion 52 which is bent upwards past the side cart front 31. The steel sheet 51 also has a rearward portion 53 which is bent upwards past the side cart rear 32.

An elongated mounting bar 60 is attached to the side cart bottom 35 adjacent the side cart front 31, said mounting bar 60 having an elongated body 61 with a proximal end 62 and a distal end 63, said proximal end 62 and distal end 63 defining a mounting bar longitudinal axis. A portion of the mounting bar body 61 is attached to the side cart bottom 35 adjacent the side cart front 31. The mounting bar body proximal end 62 is positioned nearly at the side cart right side 33. Apertures 64 are formed in the mounting bar elongated body 61 for the insertion of fasteners 65 for holding the mounting bar 60 to the side car 30. Two round apertures 66 are formed in the elongated body 61 near to the bar distal end 63 along the mounting bar longitudinal axis.

A mounting block 70 is provided. The mounting block attaches directly to the mower deck front 23 near to the mower deck right side 26. In one embodiment of the invention, the mounting block 70 has an "L" shape with a horizontal base 71 through which two threaded bolts 72 protrude vertically in an upward direction. Two hex nuts 73 engage each threaded bolt 72. The mounting block 70 has a vertical section 74 attached to said horizontal base 71. The vertical section 74 has four threaded apertures 75 formed therethrough. Three of the apertures 75 have threaded fasteners 76 threadingly inserted, said fasteners 76 adapted to engage corresponding apertures 28 in the mower assembly housing deck front 23. A mounting block bracket 77 is also provided. The bracket 77 has two vertical clearance holes 78 and one horizontal clearance hole 79. The bracket 77 is fitted over the threaded bolts 72 by means of the two vertical clearance holes 78. A fastener 29 is inserted through the horizontal clearance hole 79, through the remaining vertical section threaded aperture 75' into a corresponding aperture (not shown) in the mower assembly housing deck front 23.

The side cart 30 is attached to the mower assembly housing deck 21 by attaching the mounting bar 60 to the mounting block 70 which is fixedly attached to the housing deck front 23. The mounting bar 60 is attached to the mounting block 70 by fitting the mounting bar distal end apertures 66 over the threaded bolts 72. Each threaded bolt set of hex nuts 73 engage each side of a distal bar end aperture 66. The mounting block bracket 77 is then installed over the threaded bolts 72 and attached to the mounting bar vertical section 74.

In another embodiment of the invention an elongated stabilizer rod assembly 87 is provided, said assembly having a stabilizer rod 80 having an elongated body 81 with a rear end 82 and a forward end 83, said rear end 82 and forward end 83 defining a stabilizer rod longitudinal axis. The stabilizer rod forward end 83 is attached to a rod bracket 84 attached to the side cart rear 32 adjacent the side cart bottom 35. A hollow stabilizer sleeve 89 is also provided. The sleeve 89 has a length which is less than the length of the stabilizer rod 80 and is fitted over the stabilizer rod 80. The stabilizer rod rear end 82 is slidably attached to a stabilizer mounting bracket 85 bolted to the rider lawn mower bottom 16. The stabilizer mounting bracket 85 has an aperture 86 through which the stabilizer rod rear end 83 is inserted, said aperture 86 having a diameter less than the diameter of the stabilizer sleeve 89. The stabilizer rod 80 may slid through the stabilizer mounting bracket aperture 86 until the sleeve 89 engages the mounting bracket 85. The stabilizer rod 80 keeps the side cart longitudinal axis generally parallel to the rider lawn mower longitudinal axis.

In another embodiment of the invention, a hard plastic side cart liner 90 is provided. The liner 90 has a front 91, rear 92, right side panel 93, left side panel 94, bottom 95, and open top 96, said liner front 91 and rear 92 defining a liner longitudinal axis. The liner front 91, rear 92, right side panel 93, left side panel 94, bottom 95, and open top 96 define a liner interior 97. The liner left side panel 94 has an opening 99 extending from the liner front 91 a predetermined distance toward the liner rear 92, and extending from liner bottom 95 to top 96. The liner rear 92 has a pivot groove 98 at the liner top 96. The side cart 30 has a metal pivot rod 100 attached adjacent the side cart rear 32 and top 36 extending from the right side 33 to the left side 34. The liner 90 is adapted to fit into the side cart interior 37 with the liner pivot groove 98 engaged with the side cart pivot rod 100. The liner 90 has an elongated handle 101 rotatably attached to the liner front 91 at the liner top 96. The handle 101 extends to the liner rear 92. In operation, when the liner 90 is full of debris, the rider lawn mower 10 is brought to a desired central disposable location and halted. The side cart lid 40 is opened and the liner handle 101 pulled rearward. The liner 90 will pivot rearwardly about the metal pivot rod 100 thereby emptying the liner contents to the side rear 32.

It is understood that the above-described embodiment is merely illustrative of the application. Other embodiments may be readily devised by those skilled in the art which will embody the principles of the invention and fall within the spirit and scope thereof. In other embodiments, runners, rollers or wheels could be attached to the side cart bottom 35. Also, an open container could be mounted to the outside of the side cart rear 32 for holding a modified broom adapted to cut grass to the rear of the side cart.

I claim:

1. A rider mower grass catcher, comprising in combination:

a rider lawn mower having a front, rear, opposite sides, a top, and a bottom, said front and rear defining a rider lawn mower longitudinal axis, said rider lawn mower having a mower assembly attached to the rider lawn mower bottom longitudinally positioned between a set of forward wheels and a set of rearward wheels, said mower assembly having a housing deck covering a mower blade assembly, said housing deck having a front, a rear, a first opposite side, a second opposite side, a top, and a side grass discharge port extending from one of the housing deck sides past an adjacent rider lawn mower opposite side; and a grass catcher, comprising:

a side cart adapted to be positioned to one of the rider lawn mower opposite sides and attached to the mower assembly housing deck front, said side cart having an open front, rear panel, opposite side panels, bottom and open top, said side cart front and rear defining a side cart longitudinal axis, said side cart front, rear panel, opposite first and second side panels, bottom, and open top defining a side cart interior, said side cart first side panel having a top edge, said side cart second side panel having an opening extending from the side cart front a predetermined distance toward the side cart rear and extending from side cart bottom to top;

a lid pivotally attached to the side cart first side panel edge, said lid having a front edge, rear edge, hinged first edge, opposite second edge, an exterior surface and an interior surface, said front edge and rear edge defining a lid longitudinal axis, said hinged first edge being pivotally joined to the side cart first side top edge by means of a hinge.

2. A rider mower grass catcher as recited in claim 1, further comprising:

a protective flap attached to the side cart bottom along said side cart second side panel opening;

a metal sheet attached externally to the side cart bottom, said metal sheet having a forward portion bent upwards past the side cart front, said metal sheet having a rearward portion which is bent upwards past the side cart rear.

3. A rider mower grass catcher as recited in claim 2, further comprising:

an elongated mounting bar attached to the side cart bottom adjacent the side cart front, said mounting bar having an elongated body with a proximal end and a distal end, said proximal end and distal end defining a mounting bar longitudinal axis, said mounting bar body having a portion attached to the side cart bottom adjacent the side cart front, said mounting bar body proximal end being positioned toward the side cart first side, said mounting bar body having a plurality of apertures formed therein, said apertures adapted to receive a plurality of fasteners adapted to hold the mounting bar to the side car, said mounting bar body having a plurality of round apertures formed therein near to the bar distal end along the mounting bar longitudinal axis;

a mounting block fixedly attached to the mower deck front near to the mower deck first opposite side;

wherein the side cart is attached to the mower assembly housing deck by attaching the mounting bar to the mounting block.

4. A rider mower grass catcher as recited in claim 3, further comprising:

a stabilizer rod assembly, comprising:

a rod bracket attached to the side cart rear adjacent the side cart bottom;

a stabilizer rod having an elongated body with a rear end and a forward end, said rear end and forward end defining a stabilizer rod longitudinal axis, said stabilizer rod forward end being attached to said rod bracket;

a hollow stabilizer sleeve having a length which is a stabilizer rod length, said stabilizer sleeve being fitted over the stabilizer rod;

wherein said stabilizer rod rear end is slidably attached to a stabilizer mounting bracket attached to the rider lawn mower bottom, said stabilizer mounting bracket having an aperture through which the stabilizer rod rear end is inserted, said aperture having a diameter less than a stabilizer sleeve diameter.

5. A rider mower grass catcher as recited in claim 4, further comprising:

a side cart liner having a front, a rear, a first side panel, a second side panel, a bottom, and an open top, said liner front and rear defining a liner longitudinal axis, said liner front, rear, first side panel, second side panel, bottom, and open top defining a liner interior, said liner second side panel having an opening extending from the liner front a predetermined distance toward the liner rear and extending from liner bottom to top, said liner rear having a pivot groove at the liner top, said side cart liner having an elongated handle rotatably attached to the liner front at the liner top, said handle extending to the liner rear;

a metal pivot rod attached adjacent the side cart rear and top extending from the first side to the second side;

wherein the side cart liner is adapted to fit into the side cart interior with the liner pivot groove engaged with the side cart pivot rod.

6. A rider mower grass catcher as recited in claim 5, further comprising:

a canvass flap attached to the lid front edge.

7. A rider mower grass catcher as recited in claim 6, further comprising:

a handle centrally attached to the lid exterior surface near to the lid second edge.

8. A rider mower grass catcher as recited in claim 7, further comprising:

a protective metal flap attached to the side cart bottom along the second side opening.

9. A rider mower grass catcher as recited in claim 8, wherein:

the metal sheet attached externally to the side cart bottom is comprised of galvanized steel.

10. A rider mower grass catcher as recited in claim 9, wherein:

the mounting block has an "L" shape having a horizontal base through which a plurality of threaded bolts protrude vertically in an upward direction, said mounting block having a vertical section attached to said horizontal base, said vertical section having a plurality of threaded apertures formed therethrough, a portion of said plurality of threaded apertures having threaded fasteners threadingly inserted, said fasteners adapted to engage a plurality of corresponding apertures formed in the mower assembly housing deck front.

11. A rider mower grass catcher as recited in claim 10, further comprising:

a mounting block bracket having a plurality of vertical clearance holes and one horizontal clearance hole, said bracket adapted to being fitted over the mounting block horizontal base threaded bolts by means of the plurality of vertical clearance holes;

a fastener inserted through the horizontal clearance hole, through a mounting block vertical section threaded aperture into a corresponding aperture in the mower assembly housing deck front; and a plurality of nuts in threading engagement with each mounting block horizontal base threaded bolt.

12. A rider mower grass catcher as recited in claim 11, wherein:

the mounting bar is attached to the mounting block by fitting the mounting bar distal end apertures over the mounting block horizontal base threaded bolts, each said nut threadingly engaged to said bolts over said distal bar end apertures;

wherein the mounting block bracket is installed over the threaded bolts and attached to the mounting block vertical section.

13. A rider mower grass catcher as recited in claim 12, wherein:

said side cart liner is made from a hard plastic.

* * * * *